US000001853H

United States Statutory Invention Registration [19]

[11] Reg. Number: H1,853

Wilkiewicz

[45] Published: Jun. 6, 2000

[54] UNIVERSAL CLIENT ENGINE FOR A CLIENT-SERVER ENVIRONMENT

[75] Inventor: Jaroslaw J. Wilkiewicz, Collierville, Tenn.

[73] Assignee: DSC/Celcore, Inc., Plano, Tex.

[21] Appl. No.: 09/026,808

[22] Filed: Feb. 19, 1998

Related U.S. Application Data

[60] Provisional application No. 60/060,107, Sep. 26, 1997, and provisional application No. 60/071,145, Jan. 12, 1998.

[51] Int. Cl.[7] ..... G06F 13/14

[52] U.S. Cl. ..... 709/203

[56] References Cited

U.S. PATENT DOCUMENTS

| | | | |
|---|---|---|---|
| 5,487,101 | 1/1996 | Fletcher | 379/60 |
| 5,521,961 | 5/1996 | Fletcher et al. | 379/59 |
| 5,623,532 | 4/1997 | Houde et al. | 379/58 |
| 5,627,881 | 5/1997 | Fletcher | 379/60 |

OTHER PUBLICATIONS

Steve Chen, "*Hybrid MicroSystems: The Ultimate Flexibility in Cellular Applications*", 1996, pp. 1–16, Celcore, Inc., Memphis, Tennessee.

"*GlobalHub Mobility Manager—Enables "One Number" PCS Service Via Motorola PPS Residential Products*" pp. 1–2, Celcore, Inc., Memphis, Tennessee.

"*IS–41 Network Hub—The Mobility Manager for Celcore's GlobalSystem*" pp. 1–2, Celcore, Inc., Memphis, Tennessee, 1996.

"*GlobalHub*" pp. 1–10, Celcore, Inc., Memphis, Tennessee, 1996.

John Scourias, "*Overview of the Global System for Mobile Communications*", Mar. 27, 1996, pp. 1–16, John Scourias.

Martin A. Iroff & Steve Chen, "A distributed GSM Architecture for Low–Traffic Density Markets", *Mobile Communications International*, Oct. 1996, pp. 1–3, IBC Business Publishing, London, England.

Information pamphlet, Feb. 1997, pp. 1–7, Version 1.0, Celcore, Inc., Memphis, Tennessee.

"*BS–20/BS–21, D900/D1800 Base Transceiver Station*", pp. 1–2, Geschaftszweig Mobilfunknetze, Munchen, Germany, 1997.

"*Unique Solutions to Complex Challenges of Wireless Carriers*" pp. 1–9, Celcore, Inc., Memphis, Tennessee, 1997.

Michel Mouly and Marie–Bernadette Pautet "*The GSM System for Mobile Communications*", 1992, pp. 79–122, pp. 261–646, Cell & Sys, France Lawrence Harte, Stever Prokup, and Richard Levine "*Cellular and PCS, The Big Picture*", 1997, pp. 61–181, McGraw–Hill, United States of America.

George Lamb "*GSM made SIMple*", 1997, pp. 3–158, Regal Printing, United States of America.

*Primary Examiner*—Daniel T. Pihulic
*Attorney, Agent, or Firm*—John G. Flaim

[57] ABSTRACT

A system, and associated methods, for generating a user interface with respect to a server are provided. The system includes a client engine, which is connected by a real or virtual connection to an interface repository, an object interface module, a server interface module, and a user interface device. The client engine has the capability to transmit a request for an object reference to the object interface module, and to receive an object reference from the object interface module. The client engine also has the capability to request object type definition data from the interface repository based on the object reference and to receive the object type definition data from the interface repository. A user may then invoke a selected method on the server and receive a response generated by the server. The client engine can generate a display on a user interface connected to the client engine based on the object type definition data.

20 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

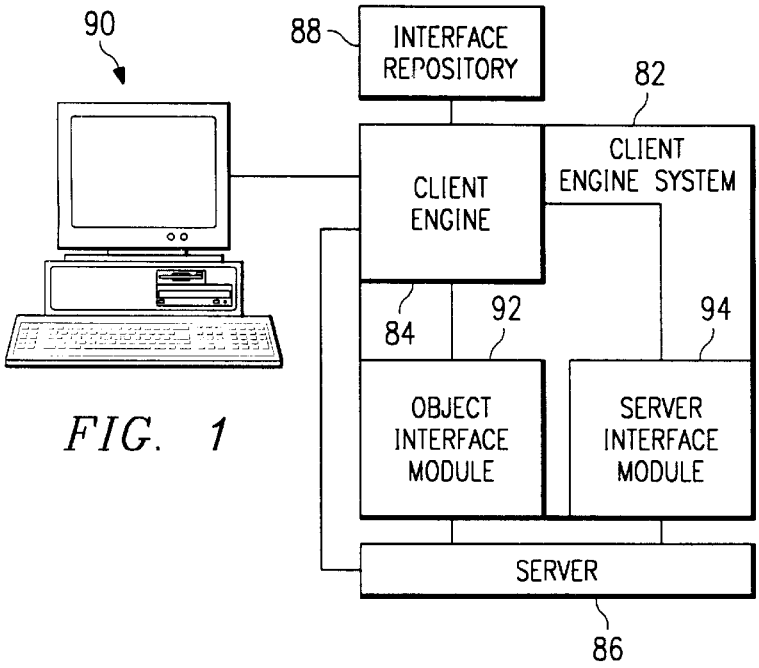
FIG. 1
FIG. 3
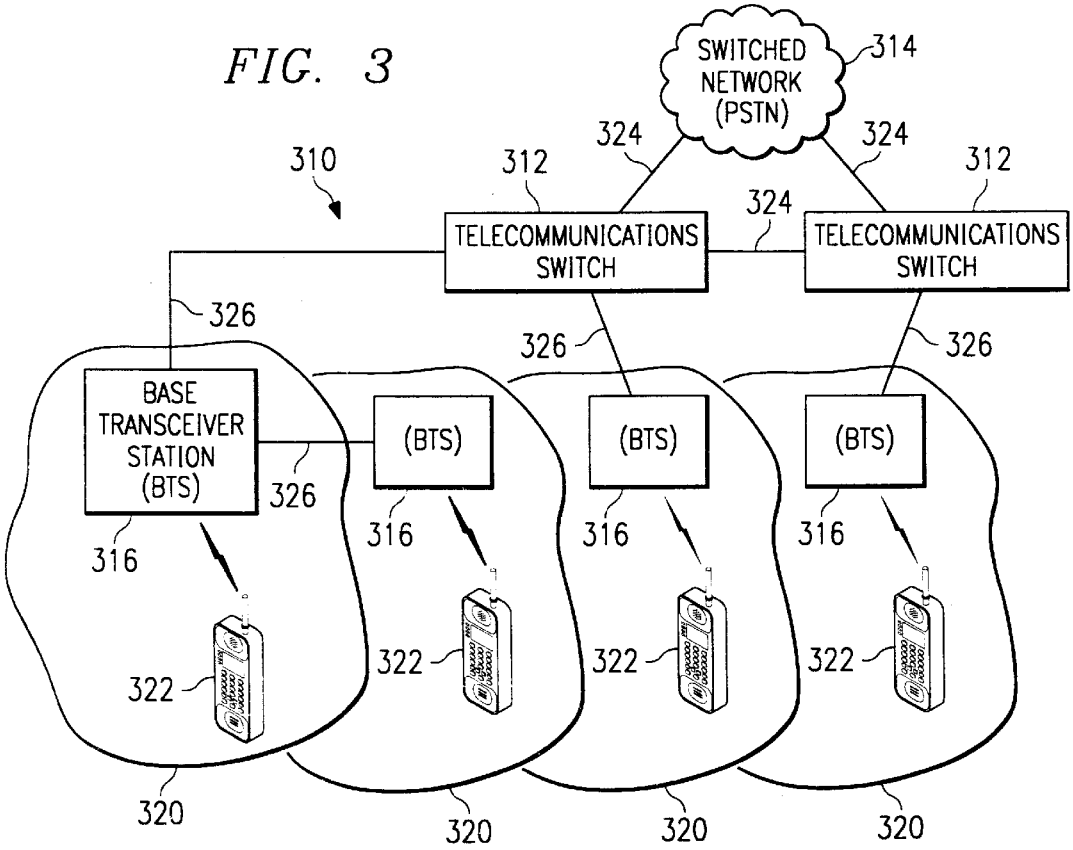

UNIVERSAL CLIENT ENGINE FOR A CLIENT-SERVER ENVIRONMENT

CLAIM OF PRIORITY

The instant patent application claims priority from (a) the U.S. provisional patent application Ser. No. 60/060,107, "Cellular Communication System," naming Anthony G. Fletcher and Scott D. Hoffpauir as inventors, filed on Sep. 26, 1997; and (b) the U.S. provisional patent application Ser. No. 60/071,145 filed Jan. 12, 1998, "System and Method for Generating Server Interface," naming Jaroslaw Wilkiewicz as inventor, filed on Jan. 12, 1998.

RELATED PATENT APPLICATIONS

The instant patent application is related to the following patent applications: (a) U.S. patent application No. 08/678,254, now U.S. Pat. No. 5,835,486 entitled "Multi-Channel Transcoder Rate Adapter Having Low Delay and Integral Echo Cancellation," naming James M. Davis and James D. Pruett as inventors, filed Jul. 11, 1996; and (b) the U.S. patent application Ser. No. 09/025,870 entitled "Integrated Telecommunications System," DSC Case No. 834-00, atty. docket no. 24194000.180, naming Anthony G. Fletcher and Scott D. Hoffpauir as inventors, commonly owned and assigned with the present application and filed contemporaneously with this application.

FIELD OF THE INVENTION

The present invention relates generally to switching systems for telecommunications, and more particularly to a client engine for the generation of a client in a client-server environment.

BACKGROUND

Switching systems are used to provide telecommunications services between multiple user interfaces. Switching systems typically use multiple processors to control the operation of various switching system components. A system architecture that accommodates and coordinates operations between two or more processors typically includes one or more server-client relationships, in which one or more processors operate as client while one or more other processors operate as servers. A client-server relationship may be utilized to improve the operating speed and reliability of the multi-processor system.

Although client-server relationships are useful, a client is often required to test the server, set-up or configure the server, or use the server from a client or remote terminal. A different client program is typically written to test each server, which results in a cost of person-hours of effort to produce code that will only be briefly used. If a client is required to set-up or use the server, then one or more such client programs must be maintained for each server. If a large number of servers are utilized in a given system, then a corresponding large amount of file space must be used to store the client programs. In addition, a significant number of person-hours of effort will be required in order to coordinate the client programs to make them uniform, and to maintain the client programs.

SUMMARY OF THE INVENTION

Therefore, a need has arisen for a system and method for generating a client that does not require a unique client program to be written, stored, and maintained for each server. In accordance with the present invention, a system and method for a client engine that generates clients for interfacing with a server are provided that substantially eliminate or reduce disadvantages and problems associated with previously developed systems and methods for interfacing with a server.

One aspect of the present invention is a system for generating a user interface. The system includes a client engine, which is connected by a real or virtual connection to an interface repository, an object interface module, a server interface module, and a user interface device. The client engine has the capability to transmit a request for an object reference to the object interface module, and to receive an object reference from the object interface module. The client engine also has the capability to request object type definition data from the interface repository based on the object reference and to receive the object type definition data from the interface repository. The client engine can generate a display on a user interface connected to the client engine based on the object type definition data.

Another aspect of the present invention is a method for generating a user interface. The method includes causing transmission of an object marker to a server from a client engine system. An object reference is then received from the server at the client engine system. An interface description request is then transmitted from the client engine system to an interface repository, and interface description data is received from the interface repository at the client engine system. A display is then generated based on the interface description data.

Yet another aspect of the present invention is a method for generating a user interface. The method includes requesting object marker data with a client engine. The object marker data is then transmitted to a server. An object reference is then received from a server at the client engine. Interface data is then requested from an interface repository using the object reference. The interface data is received from the interface repository at the client engine. A data prompt is then generated containing the interface data.

The present invention provides many important technical advantages. One important technical advantage of the present invention is a system for generating a user interface that does not require a unique client program to be written for each server. The system for generating a user interface of the present invention thus eliminates the need to spend productive time creating programs that will only be briefly used to test a server that will not subsequently require an interface program. Another important technical advantage of the present invention is a method for generating a user interface that may be used to provide a client for use with one or more servers. The method for generating a client of the present invention thus allows a single client engine to be used to provide a user interface to servers for testing, set-up, or use instead of requiring unique programs for each server and for each application.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 1 is a block diagram illustrating a client engine system, in accordance with an exemplary embodiment of the present invention;

FIG. 3 is a block diagram illustrating a telecommunications network, in accordance with an exemplary embodiment of the present invention.

DETAILED DESCRIPTION OF THE DRAWINGS

Figure 2A:
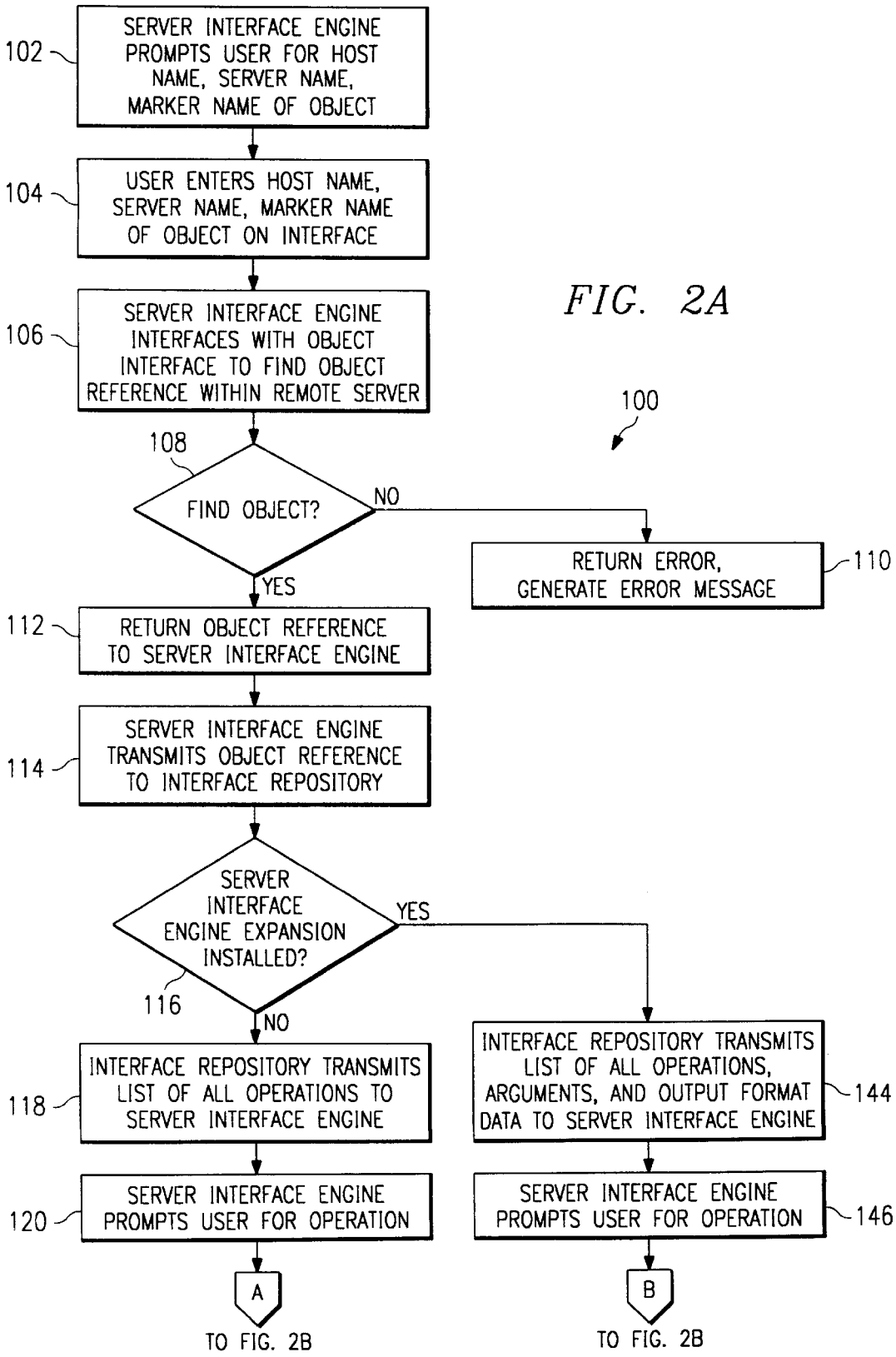
FIGS. 2A and 2B are a flow chart illustrating a method for a client engine system, in accordance with an exemplary embodiment of the present invention.

FIG. 1 illustrates a universal client engine system 82 and associated elements for interfacing with a server in accordance with an exemplary embodiment of the present invention. Such client engine system 82 may be used to interface with a server 86 for developmental and/or operational purposes, and does not require server-specific programming.

The client engine system 82 may be implemented in software, hardware or a suitable combination of software and hardware. For example, the client engine system 82 may be a software system that operates on a suitable platform, such as a personal computer, a work station, a lap top computer or other suitable hardware platforms. The client engine system 82 may operate on, and be connected to, a terminal 454 of a telecommunications switch 312. The client engine system 82 is preferably connected to a server 86 and an interface repository 88, which contains data that defines the operations, arguments and output formats for predetermined servers. The connections between the client engine system 82 and other components, and between the elements of the client engine system 82, may be either real, such as with conductors or other physical media, or virtual, such as by logical components of a computing platform.

The client engine system 82 is operable to receive object data from a user via a user interface device 90, and to transmit the object type data to an interface repository 88. The client engine system 82 then queries the user via the user interface device 90 to provide argument data for submission to a server 86. After the user enters the argument data, the client engine system 82 converts the user-entered argument data into the format required by the server 86. The client engine system 82 then transmits the formatted argument data to the server 86, and receives the data generated by the server 86 in response to the argument data. The data is then converted into the proper output format for display on the user interface device 90.

The client engine system 82 preferably further includes a client engine 84, an object interface module 92 and a server interface module 94. The client engine 84 is preferably connected an object interface module 92, a server interface module 94, a server 86, an interface repository 88 and the user interface device 90. The client engine 84 may be implemented in software, hardware, or a suitable combination of software and hardware. The client engine 84 is operable to query the server with argument data, and may be configured to use an object interface module 92 such as an Orbix™ Common Object Request Broker Architecture "string_to_object" function. The client engine 84 may also be configured to use a server interface module 94 such as an Orbix™ Common Object Request Broker Architecture "Request" class and a Dynamic Invocation Interface.

The object interface module 92 may be implemented in software, hardware or a suitable combination of software and hardware. The object interface module 92 is operable to receive object data from the client engine 84, such as host name data, server name data and object marker data, to query a server for object reference data, and to return an object reference from a server if the object defined by the object data exists. If no object exists, the server 86 generates an error code and the object interface module 92 returns an error message.

The server interface module 94 may be implemented in software, hardware or a suitable combination of software and hardware. The server interface module 94 is operable to receive argument data and to transmit the argument data to a server 86. The server interface module 94 is typically not required for interfacing the data generated by the server 86 in response to the argument data back to the client engine 84.

An interface repository 88 may be implemented in software, hardware or a suitable combination of software and hardware. An interface repository 88 may be distributed or centralized, and typically maintains data that defines the operations, arguments and output formats for predetermined objects of predetermined servers.

A server 86 may be implemented in software, hardware or a suitable combination of software and hardware. A server 86 typically comprises a software application operating on a suitable hardware platform. For example, the server 86 may be a server operating on a network management server 50 of the telecommunications switch 312. The server 86 is operable to receive data from a client, to perform data processing functions responsive to that data, and to generate predetermined responses to the data for transmission back to the client or to other systems or devices. For example, the server 86 may receive object marker data from the object interface module 92, return object reference data if the object is known to the server 86, and return an error if the object is not known to the server 86. Likewise, the server 86 may receive argument data from a server interface module 94, and generate data in response to the argument data.

A user interface device 90 is preferably suitable to transmit and receive data with respect to the client engine system 82 and to generate a user interface. For example, a user interface device 90 may be a terminal 454 of a telecommunications switch 312. A user interface device 90 may also, for example, be a laptop computer, desktop computer, a remote terminal, a workstation or other suitable user interfaces. The user interface system 90 is operable to receive data from a user, and to generate graphical and textual data that may be interpreted by the user.

In typical operation, a client engine system 82 is provided to allow a user to interface with a server 86. The server 86 may be a test server that is being developed for use, or may also or alternatively be an existing server that is in use or operation. A user initiates the client engine system 82, which prompts the user for object marker data. After the user enters the object marker data, the client engine sysetem 82 obtains data that describes the operations, arguments, and output data formats pertaining to the object from an interface repository 88. The user enters argument data for submission to the server and transmits the data to the server 86. The server response data is received by the client engine system 82 and is converted into a user-readable format. In this manner, the use may test or interface with a server 86 without the need for design and storage of server-specific interface software.

Although the client engine system 82 has been described in context of a telecommunications switch operating environment, it may be readily appreciated that the client engine system 82 may be employed in the context of other operating environments utilizing a client-server architecture. For example, a client engine system 82 may be employed in a computer network, such as a local area network or wide area network, a computer control network for controlling manufacturing or plant operations or other suitable network environments.

Figure 2B:
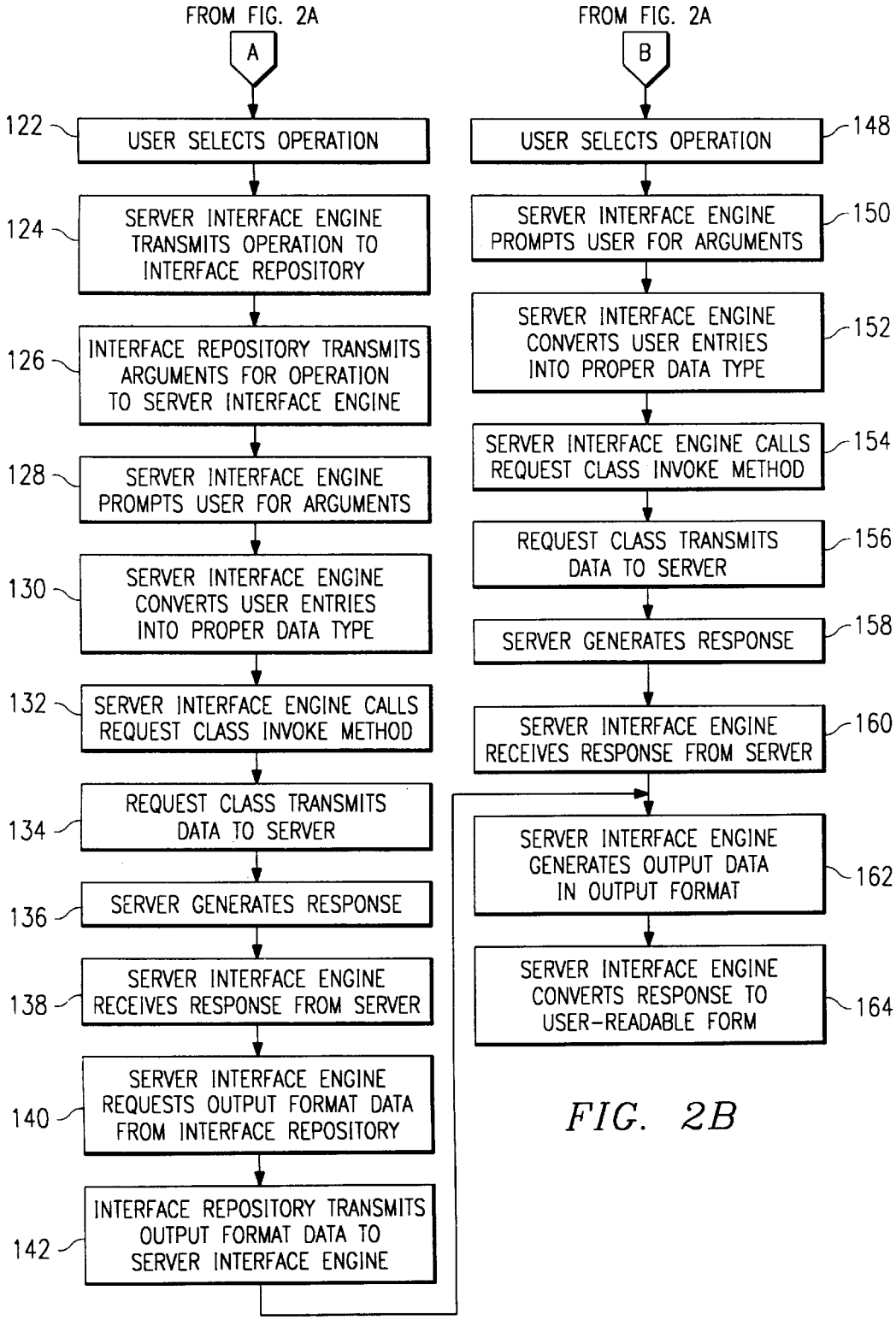

FIGS. 2A and 2B illustrate a method 100 associated with the client engine system 82 in accordance with one embodiment of the present invention. Such method 100 may be implemented in software, hardware, or a suitable combination of hardware and software on a suitable platform, such as terminal 454 of FIG. 4.

Such method 100 begins at step 102, where the client engine prompts the user for the host name, server name, and marker name of an object. Other suitable data may also or alternatively be prompted from the user. The method then proceeds to step 104, where the user enters the requested data. At step 106, the client engine invokes an object interface module, such as a "$string_{13}$ to_object" method, which is used to verify that the object exists within the remote server.

At step 108, it is determined whether the object has been found. If the object has not been found, the method proceeds to step 110, where an error is returned and an error message is generated.

If the object has been found, the method proceeds to step 112, where an object reference is returned to the client engine. At step 114, the client engine then transmits the interface type for the object reference to an interface repository that holds interface information for predetermined servers. The method then proceeds to step 116, where it is determined whether a client engine expansion has been installed.

The client engine expansion is a memory cache that allows the client engine to receive all of the interface data pertaining to a predetermined interface from the interface repository and to display it to the user in a suitable format. If the client engine expansion has not been installed, the method proceeds to step 118. At step 118, the interface repository transmits a list of all operations for the transmitted object reference to the client engine.

At step 120, the client engine prompts the user to select an operation, such as by listing all available operations and allowing the user to select one or more of the operations. The user enters a selection at step 122, and the method proceeds to step 124 where the client engine transmits the operation to the interface repository.

At step 126, the interface repository transmits all of the argument description (such as type and name) for the operation to the client engine. The client engine then prompts the user for input values for the arguments at step 128. The user-entered inputs are converted into a proper data type and data format at step 130. For example, the user may enter various fields that may require conversion into a specified data structure.

After the arguments are assembled by the client engine, the method proceeds to step 132 where a server interface module is used, such as a "Request" class. The server interface module receives the assembled arguments at step 132, and transmits the assembled argument data to the server at step 134. The server receives the arguments and generates a response in accordance with the server programming at step 136.

At step 138, the response is received at the client engine. The client engine requests the output data format for the response from the interface repository at step 140, and the interface repository transmits the output data format to the client engine at step 142. The method then proceeds to step 162.

If the client engine expansion has been installed, the method proceeds from step 116 to step 144. Steps 144 through 160 are similar to steps 118 through 142, with the difference being that all interface description data pertaining to the operations, arguments, and output formats that are associated with the object reference are transmitted to the client engine from the interface repository at step 144. This process eliminates the need to request additional data from the interface repository, such as at steps 124 and 140. Because the data is provided before a decision is made by the user regarding what data is required, the client engine expansion is required to process and store the additional data until it is required for use.

At step 146, the client engine prompts the user to select an operation, such as by listing all available operations and allowing the user to select one or more of the operations. The user enters a selection at step 148, and the method proceeds to step 150 where the client engine prompts the user for input values for the arguments.

The user-entered inputs are converted into a proper data type and data format at step 152. For example, the user may enter various fields that may require conversion into a specified data structure. After the arguments are assembled by the client engine, the method proceeds to step 154 where a server interface module is invoked using a "Request" class. The server interface module receives the assembled arguments at step 154, and transmits the assembled argument data to the server at step 156. The server receives the arguments and generates a response in accordance with the server programming at step 158.

At step 160, the response is received at the client engine. The method then proceeds to step 162, where the client engine generates output data in the output format provided by the interface repository. For example, the data generated by the server is typically an undifferentiated stream of data that must be converted into a user-readable form. The client engine converts the generated output data into a user-readable form at step 164, such as by generating a graphic user interface or text user interface that contains text and/or graphics.

In operation, method 100 is implemented by a user to interface with a server. Method 100 may be used to test a server that is being developed to determine whether the server is performing the desired functions. Likewise, method 100 may be used to query an operational server to perform operational or diagnostic work with the server. Method 100 may be used to interface with two or more servers instead of using software that has been written for each server.

FIG. 3 illustrates a telecommunications network 310 embodying concepts of the present invention. The telecommunications network 310 is a general telecommunications system that may be used to provide telecommunications services to users, without requiring the users to access land based telecommunications interfaces, such as telephone handsets. Telecommunications network 310 may be a Public Land Mobile Network (PLMN).

The telecommunications network 310 includes one or more telecommunications systems or switches 312. A telecommunications system 312 is a self-contained telecommunications system, and may be coupled to another telecommunications switch 312. A telecommunications switch 312 is typically coupled to a switched network 314, such as the Public Switched Telephone Network.

A telecommunications switch 312 may be coupled to one or more base transceiver stations 316, and may be configured to control the operation of any base transceiver station 316 coupled to the telecommunications switch 312. A base transceiver station 316 is used to control wireless telecommunications traffic in a service area or cell 320. Subscriber units 322 are used in conjunction with the base transceiver stations 316 and the telecommunications switches 312 to communicate with other subscriber units 322 or with the switched network 314.

The telecommunications switch 312 may be coupled to other telecommunications switches 312, the switched network 314 and to base transceiver stations 316 by a suitable transmission link 24, such as an E1 telecommunications line. Similarly, a base transceiver station 316 may be coupled to another base transceiver station 316 by a suitable transmission link 26. An E1 telecommunications line carries 2.0448 megabits of data per second in a standard data format. This standard data format is organized as 30 digitally-encoded telecommunications channels carrying 64,000 bits per second for voice or data applications. In addition, the standard data format includes a single 64,000 bit per second data channel for signaling data, and a single 64,000 bit per second channel for framing, synchronization, maintenance, and control purposes. The base transceiver stations 316 may also transfer data to the telecommunications switches 312 in a Link Access Protocol on the D Channel (LAP-D) data format.

In operation, a user attempts to establish a telecommunication channel using a subscriber unit 322. The user, located in a cell 320, activates a subscriber unit 322, which transmits a service request to a base transceiver station 316 using radio frequency electromagnetic radiation. This radio frequency electromagnetic radiation includes encoded data in a suitable data transmission format, such as, for example, time division multiple access or code division multiple access. Once received, the base transceiver station 316 transmits the service request to the telecommunications switch 312. The telecommunications switch 312 then determines the destination identified by the service request and establishes a telecommunications channel with that destination.

For example, if the destination is another subscriber unit 322 that is serviced by the telecommunications switch 312 processing the service request, the telecommunications switch 312 will transmit control and signaling data to the appropriate base transceiver station 316. This control and signaling data will be used to notify the user of the subscriber unit 322 that an incoming call is being attempted. Alternatively, the telecommunications switch 312 may transmit control and signaling data to another telecommunications switch 312, which will then transmit appropriate control and signaling data to a base transceiver station 316 for communication with a subscriber unit 322 serviced by that other telecommunications switch 312.

If the user at the subscriber unit 322 transmits a request for service that identifies a destination associated with a switched network 314, the telecommunications switch 312 will transmit appropriate signaling and control data to the switched network 314. In addition, the telecommunications switch 312 will receive signaling and control data from the switched network 314 that indicates whether a telecommunications channel has been successfully established with the identified destination. After a telecommunications channel is established, the telecommunications switch 312 performs operation, administration, maintenance and provisioning functions to maintain the telecommunications channel until the call is completed. Once completed, the telecommunications switch 312 de-allocates the call resources.

Figure 4:
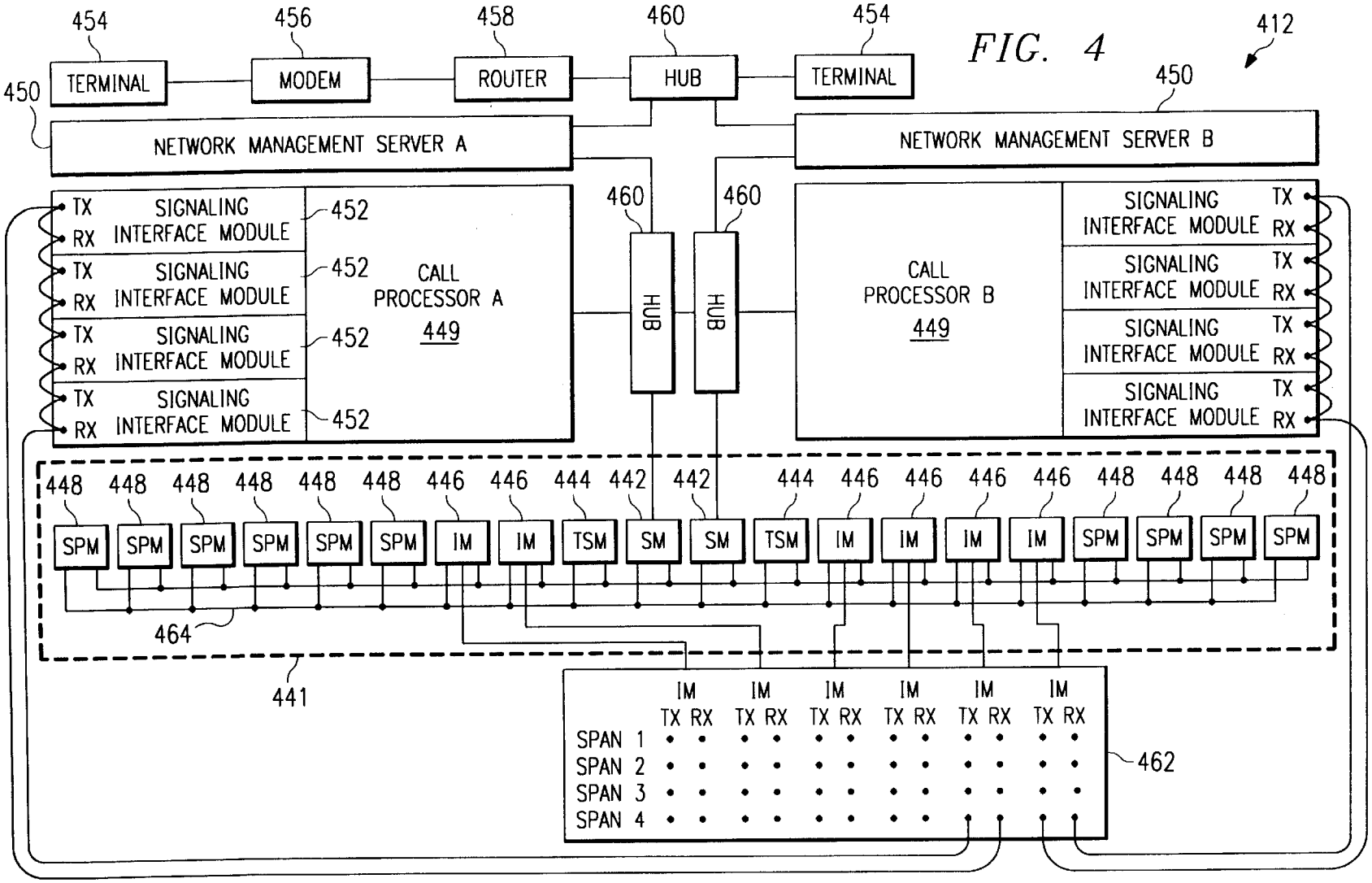
FIG. 4 is a block diagram illustrating a telecommunications switch, in accordance with an exemplary embodiment of the present invention.

FIG. 4 illustrates a telecommunications switch 312. The telecommunications switch 312 includes multiple resource modules 441 that provide other elements and components of the telecommunications switch 312 with suitable resources, such as, for example, switching, rate adaption and transcoding functions. In accordance with an exemplary embodiment, one or more switching modules 4442, interface modules 446, telephony support modules 444 and signal processing modules 448 are provided within a resource assembly 441. The interface modules 446, signal processing modules 448 and telephony support modules 444 are coupled through one or more of the switching modules 4442. Control information is provided by a switching module 4442 to other modules over the redundant control bus 64. Data is provided by a switching module 4442 to other modules over a high speed bus 65.

A switching module 4442 may be implemented in software, hardware or a suitable combination of software and hardware. A switching module 4442 preferably performs switching operations, clock operations, and local communications between resources of the resource assembly 441 of the telecommunications system 312. These operations may be performed using pulse code modulation switching and data transfer techniques, Link Access Protocol on the D Channel (LAP-D) communications and Ethernet interface communications. The switching module 4442 may include one or more server or client systems that facilitate the operation of switching module 4442.

A switch 43 preferably resides within a switching module 4442 to perform the switching functions and operations. That switch 43 may be a timeslot switch having a memory timeslot matrix to make required timeslot cross-connections within the telecommunications system 312. The switch 43 functions to set up and tear down both simplex and duplex connections between two specified channels, which may represent a call or other useful connections. For example, the switch 43 may cause a channel to connect a channel (provided by, for example, a base transceiver station 316 or a switched network 314) to a call progress tone or a voice announcement. Further, the switch 43 should be operable to set up system defined connections upon power up and reset as well as connections for the testing of timeslots when not in use. Timeslots are preferably provided to the timeslot switch via the high speed bus 65.

A switching module 4442 may also, for example, include suitable digital data processing devices, a processor, random access memory and other devices. Preferably, each switching module 4442 runs a suitable operating system, and include one or more pulse code modulation bus interfaces, one or more High Level Data Link Controller (HDLC) control bus interfaces, one or more Ethernet interfaces, and an arbitration bus interface to other switching modules 4442.

A telephony support module 444 may be implemented in software, hardware or a suitable combination of software and hardware. A telephony support module 444 may, for example, provide tone generation, R2 digit transceiver functions, and digitized announcement generation for the telecommunications system 312. Telephony support modules 444 may also provide call setup functions, such as digit collection and out-pulsing, and call completion functions, such as digitized announcement generation and call supervisory tone generation. A telephony support module 444 may, for example, include suitable telecommunications data processing equipment, such as a processor, random access memory, one or more redundant High Level Data Link Controller bus interfaces, one or more pulse code modulation buses, and an arbitration bus for establishing active telephony support module 444 status. Preferably, a single telephony support module 444 provides all required functionality for the telecommunications system 312, and one or more additional telephony support modules 444 are used to provide redundancy in the event of component failure. The telephony support module 444 may include one or more server or client systems that facilitate the operation of telephony support module 444.

An interface module 446 is an interface device that is used to interface a suitable number of telecommunications lines that carry data in a predetermined format, such as an E1 data format, with the telecommunications system 312. Interface modules 446 provide the physical interface between the telecommunications system 312 and other equipment, a switched network 314 and base transceiver stations 316. Interface modules 446 also support in-band trunk signaling for DS0 data channels that are configured for channel associated signaling, and transmit data to and receive data from a signal processing module 448. An interface module 446 may be implemented in software, hardware or a suitable combination of software and hardware. For example, an interface module 446 may include suitable data processing equipment, such as a processor, random access memory, up to four E1 ports, redundant High Level Data Link Controller bus interfaces, and pulse code modulation bus interfaces. The interface module 446 may include one or more server or client systems that facilitate the operation of interface module 446.

A signal processing module 448 is preferably used to provide an interface between a call processor assembly 449 and a signaling system. For example, signaling data may be received from a data transmission channel from the switched network 314, and may be switched to another data transmission channel, such as an E1 telecommunications channel, from an interface module 446 to a signal processing module 448 by a switching module 4442. A signal processing module 448 is also preferably employed to perform transcoding and rate adaption functions, such as converting from a wireless system speech encoding format to a pulse code modulation data format, as well as other functions, such as echo cancellation functions. For example, signal processing modules 448 may be employed by telecommunications system 312 to convert data from the GSM data format to another format, such as the pulse code modulation data format. The signal processing module 448 may include one or more server or client systems that facilitate the operation of signal processing module 448.

An example of a signal processing module 448 that provide transcoding, rate adaption, and echo-cancellation functions, and using an improved decoding process, is disclosed in U.S. patent application Ser. No.08/678,2454, now U.S. Pat. No. 5,835,486 entitled "Multi-Channel Transcoder Rate Adapter Having Low Delay and Integral Echo Cancellation," naming James M. Davis and James D. Pruett as inventors, filed Jul. 11, 1996, commonly owned and assigned with the present application and which is incorporated by reference herein for all purposes.

A signal processing module 448 may be implemented in software, hardware or a suitable combination of software and hardware. In addition to one ore more digital signal processors, a signal processing module 448 may include suitable data processing equipment, such as a processor, random access memory, four daughter board module ports, redundant High Level Data Link Controller bus interfaces, pulse code modulation matrix bus interfaces and other signal processing application hardware.

The telephony support modules 444, the interface modules 446, and the signal processing modules 448 are preferably coupled through switching modules 4442 and hub switches 460 to redundant call processor system 449. The call processor system 449 is operable to control the function of components of the telecommunications switch 312.

The call processor system 449 is a general purpose computing platform, such as a PentiumTM II based computing platform, that includes suitable hardware and software systems to support telecommunications processing. The call processor system 449 may use a real-time operating system such as QNXTM to support the real-time call processing requirements of the telecommunications switch 312. The call processor system 449 may include one or more server or client systems that facilitate the operation of call processor system 449.

The call processor system 449 preferably includes one or more systems that allow it to perform the functions of a base station controller system and a message switching center system. In addition, the call processor 449 provides other elements that take part in processing calls directed to, or initiated by, the subscriber units 322. Specifically, the call processor system 449 includes a call processing application that provides various cell processing and signaling functions, such as call origination and termination functions, as well as location updating and handover of mobile subscribers.

For example, the call processing application may provide GSM call processing functions and include a visitor location register, a home location register, a mobile application part, a base station subscriber, a mobile switching center, an SS7 signaling element, and other suitable elements. An example of a GSM call processing application that may be used to provide the functionality of call processor system 449 is described in the U.S. patent application Ser. No. 09/025,870 entitled "Integrated Telecommunications System," DSC Case No. 834-00, atty. docket no. 24194000.180, naming Anthony G. Fletcher and Scott D. Hoffpauir as inventors, commonly owned and assigned with the present application, filed contemporaneously with this application, and which is hereby incorporated by reference for all purposes.

A call processor system 449 may be coupled to a primary and a secondary network management server 50. Primary and secondary network management servers may be redundant network management systems servers that provide operation, administration, maintenance and other functions for elements of the telecommunications switch 312. Network management servers 50, may, for example, incorporate the functionality of both an Operations Maintenance Center—Radio (OMC-R) and an Operations Maintenance Center—Switching (OMC-S).

The network management servers 50 may be implemented in software, hardware, or a suitable combination of hardware and software. For example, the network management servers 50 may include software programs in a suitable programming language, such as a commercially available server program that includes additional server programs written in C++ Java programming languages. Each network management server operates on a suitable hardware platform, such as a PentiumTM II based computing platform, that includes suitable hardware and software to support telecommunications processing. The hardware platform may also or alternatively include other processors such as those embodied in laptops computers, desktop computers, workstations, or other suitable devices. The network management servers 50 include server systems that support the operation of components of telecommunications system 312. These server systems include, by way of example and not limited to, a base station controller server, a resource manager server, a message switching center server, a signaling system server, a mobile application part server, a visitor location register server, and a home location register server.

The signaling interface modules 452 are coupled to the call processors 449 and the interface modules 446, and are used to provide an interface between the call processors 449 and a signaling system. For example, data may be received from a transmission link 24, from a switched network 314, or other switches 40, and may be switched to a transmission link 24, such as an E1 telecommunications channel, from interface modules 446 to signaling interface module 452 by switching modules 4442.

One or more terminals 454 are preferably provided in connection with the telecommunications system 312. The terminals 454 are coupled to the network management servers 50 either directly or through a modem 456, a router 458, and hub switch 460. The terminals 454 are used to interface with the network management servers 50. The terminals 454 and the network management servers 50 comprise a network management system that allows a user to remotely monitor and manage a telecommunications switch 312.

Terminals 454 include software, hardware or a suitable combination of software and hardware that allows them to operatively interface with the network management servers 50.

This software may include a client engine system that allows a programmer to interface with a functioning server, or test a developmental server for implementation on network management servers 50 or other components of telecommunications switch 312. The client engine system of the present invention does not require an interface program to be specifically designed for the test server, or any other server. Instead, the generic client for a client-server environment of the present invention allows the programmer or a user to interface with any server operating on telecommunications switch 312 that may be accessed by terminal 454. The programmer or user may use the client engine system to design a test server or to interface with an existing server under normal operations.

In operation, a programmer or user interfaces with a server operating on the telecommunications switch 312 through a terminal 454. This server may, for example, be a test server that is under development or testing or an existing server that has been resident on the telecommunications switch 312. A client engine system operating in association with a terminal 454 is therefore needed to allow a user or programmer to interface with a server.

The client engine system receives object marker data from a user or programmer, and obtains the operations, arguments and output data formats pertinent to the server being tested. The user then submits arguments to the server through the client engine system, and reviews the data generated by the server in response to the submitted arguments, after it has been converted into a user-readable format by the client engine system. In this manner, server software used in telecommunications switch 312 may be designed and tested without requiring server-specific interface software to be designed, stored and executed for each server.

While FIG. 3 and FIG. 4 illustrate a telecommunications switch 312 within which the present invention may be employed, it should be appreciated that the present invention may also be employed in numerous other systems and environments within the spirit and scope of the present invention.

Although several embodiments of the present invention and its advantages have been described in detail, it should be understood that changes, substitutions, transformations, modifications, variations, and alterations may be made therein without departing from the teachings of the present invention, the spirit and the scope of the invention being set forth by the appended claims.

What is claimed is:

1. A system for generating a user interface comprising:

a client engine connected to an interface repository, an object interface module, a server interface module and a user interface device; and wherein the client engine is operable to transmit a request for object reference to the object interface module, to receive an object reference from the object interface module, to request object type definition data from the interface repository based on the object reference, to receive the object type definition data from the interface repository, and to cause a display on a user interface connected to the client engine based on the object type definition data.

2. The system of claim 1 further comprising an object interface module connected to a server that is operable to query the server for object reference data, to receive the object reference data from the server and to cause the object reference data or an error code to be transmitted to the client engine.

3. The method of claim 1 further comprising a server interface module connected to a server is operable to query the server with argument data, and to receive data generated by the server in response to the argument data, and to cause the server generated data to be transmitted to the service interface engine.

4. The system of claim 1 further comprising an interface repository that is operable to store server interface data, including operation data, argument data and output format data.

5. The system of claim 2 further comprising a server connected to the object interface module, wherein the server is operable to receive object marker data from the object interface module, to verify that the object is known to the server, and to return an error if the object is not known to the server.

6. The system of claim 3 further comprising a server connected to the server interface module, wherein the server is operable to receive argument data from the serve interface module and to generate data in response to the argument data.

7. A method for generating a user interface comprising:

causing transmission of an object marker to a server from a client engine system;

receiving an object reference from the server at the client engine system;

causing transmission of an interface description request from the client engine system to an interface repository;

receiving interface description data from the interface repository at the client engine system; and generating a display based on the interface description data.

8. The method of claim 7 wherein transmitting an object marker to a server from a client engine system comprises:

prompting a user for one or more of host data, server data, and object marker data;

causing the host data, server data and object marker data received from a user to be transmitted to the server from the object interface module.

9. The method of claim 7 wherein receiving an object reference from the server at the client engine system comprises:

receiving an error code if an object reference is not found; and receiving object reference data if an object reference is found.

10. The method of claim 7 wherein transmitting an interface description request from the client engine system to an interface repository comprises transmitting a request for one or more of operation data, argument data, and output format data associated with an object reference to the interface.

11. The method of claim 7 wherein receiving interface description data from the interface repository at the client engine system comprises receiving one or more of operation data, argument data, and output format data from the interface repository that pertains to an object reference.

12. The method of claim 7 wherein receiving interface description data from the interface repository at the client engine system comprises:

receiving operation data at the client engine system;

prompting a user to select one or more operations based on the operation data;

causing a request for argument data to be transmitted from the client engine system to the interface repository; and receiving argument data pertaining to the operations at the client engine system.

13. The method of claim 7 wherein generating a display containing the interface description data comprises:

prompting a user to select one or more operations from a list of available operations;

prompting the user to enter argument data for arguments pertaining to the selected operations;

causing the argument data entered by the user to be transmitted to the server; and generating a display based on the server response to the argument data.

14. A method for generating a user interface comprising:

requesting object marker data with a client engine;

causing trnamission of the object marker data to a server;

receiving an object reference from a server at the client engine;

requesting interface data from an interface repository using the object reference;

receiving the interface data from the interface repository at the client engine; and, generating a data prompt containing the interface data.

15. The method of claim 14 wherein requesting object marker data with a client engine comprises:

generating a user interface with the client engine that includes a prompt for one or more of host data, server data, and object marker data;

receiving data at the client engine in response to the prompt; and converting the received data into a format that is compatible with a predetermined server.

16. The method of claim 14 wherein causing transmission of the object marker data to a server comprises:

transmission of the object marker data to an object interface module from the client engine;

causing further transmission of the object marker data to the server from the object interface module; and transmitting an error code of object reference data from the server to the client engine.

17. The method of claim 14 wherein generating a data prompt containing the interface data comprises:

generating a data prompt containing a list of operations; and receiving a user-entered selection of one or more operations from the list of operations.

18. The method of claim 14 further comprising:

receiving one or more operations identifiers at the client engine;

prompting the user with the client engine for argument data pertaining to the one or more operations identifiers;

receiving the argument data at the client engine; and converting the argument data into a format that is compatible with a predetermined server.

19. The method of claim 18 further comprising:

causing transmission of the converted argument data to a server interface module from the client engine;

causing transmission of the converted argument data to a predetermined server from the server interface module;

receiving server-generated response data at the client engine; and generating a display based on the server-generated response data.

20. The method of claim 19 wherein generating a display based on the server-generated response data comprises:

converting the server generated response into user data in accordance with output format data received from the interface repository; and converting the user data into a user-readable format.

* * * * *